Sept. 20, 1971 S. R. FENCEL 3,606,184

CONTINUOUS LOOP TAPE RECORDER WITH DRIVEN TAPE PACK

Filed April 24, 1968 2 Sheets-Sheet 1

Inventor
Stanley R. Fencel
By James J. Jennings, Jr.
Attorney

Sept. 20, 1971 S. R. FENCEL 3,606,184

CONTINUOUS LOOP TAPE RECORDER WITH DRIVEN TAPE PACK

Filed April 24, 1968 2 Sheets-Sheet 2

Inventor
Stanley R. Fencel

By James J. Jennings, Jr.
Attorney

United States Patent Office 3,606,184

Patented Sept. 20, 1971

3,606,184

CONTINUOUS LOOP TAPE RECORDER WITH DRIVEN TAPE PACK

Stanley R. Fencel, Westminster, Calif., assignor to Borg-Warner Corporation, Chicago, Ill.

Filed Apr. 24, 1968, Ser. No. 723,736
Int. Cl. B65h 17/46, 17/48
U.S. Cl. 242—55.19R 5 Claims

ABSTRACT OF THE DISCLOSURE

A tape recorder of the endless loop type in which the tape, pack, or "cartridge," is supported around a hub, which is positively driven by the same belt which couples the capstans to the drive motor.

BACKGROUND OF THE INVENTION

In many endless loop tape recorders a magnetic tape is stored by winding onto the outer layer of a tape pack. Sometimes the pack is termed a "cartridge," although the tape pack is not physically encased in a removable cassette or cartridge. Tape is drawn off from the innermost turn of the pack or cartridge and fed past the input capstan, adjacent the heads, and thence past the take-up capstan back to the exterior loop of the tape cartridge. There is no positive drive of the tape pack, but the angular displacement of the pack is effected by the haul-off of the tape from the interior of the pack by the input capstan. When such a tape recorder is started by energizing the motor and driving the capstans, a considerable strain is placed upon the tape until the tape pack and its restraining mechanism accelerate and move at the same speed as the velocity at which the tape is being hauled off by the input capstan. In addition when such a recorder is turned off the capstans usually decelerate faster than does the cartridge, so that the tape in the pack overruns and a large loop is "thrown" or formed due to this unbalance in deceleration. The loop thus thrown can lead to tangling when the equipment is again energized. In the past felt pads or other mechanical braking devices were applied to the tape between the point of exit from the pack and the input capstan, but this leads to wear upon the tape and an increase of the stresses actually applied. Such arrangements frequently have caused physical tape distortion, and "scalping" or peeling of the magnetizable particles from the tape base during acceleration. These conditions are magnified when the equipment is operated in severe environmental conditions, in that the high gravity forces encountered are added to the normal tape acceleration values to produce very undesirable stress forces in the tape.

It is also noted that in such recorders, when the tape is fed into the outside layer of the pack and withdrawn from the interior with substantially the same linear speed, there is a different absolute velocity of the tape at the points of entry and exit. The tape pack must accommodate to these variations by having slightly varying speeds of each turn of the tape within the pack or cartridge. Accordingly there must be free sliding movement between the inside and outside layers to accommodate these differences. It is apparent that any constriction or restraint of movement of the tape strand on the outside layer will constrict the entire pack or cartridge.

It is therefore a primary consideration of this invention to provide for concomitant acceleration of the tape pack and capstans in a system which obviates the use of felt pads and all mechanical brakes, and also to minimize any stresses placed upon the tape as it is fed back onto the outside layer of the pack.

SUMMARY OF THE INVENTION

An endless loop tape recorder constructed in accordance with the inventive teaching includes an annular hub for receiving and indexing the tape pack, and a hub extension is mechanically coupled to the hub itself. This hub extension includes a portion which supports the tape pack, such that the tape pack is accelerated as the hub extension is accelerated. At least one head is positioned adjacent the tape path. A haul-off or first capstan is disposed between the point at which the strand of tape is drawn from the inside of the tape pack and the tape head, and this haul-off capstan is arranged to draw tape out from the center of the pack and pass the tape toward the head at a first rate. A second or output capstan is disposed between the tape head and the point at which the tape is returned to the outermost portion of the tape pack, and this output capstan is arranged to drive the tape at a second speed which is at least slightly greater than the first speed at which the first capstan is operated. A motor is connected to drive both the first and second capstans; by way of example, the motor can be coupled directly to one of the capstans and a drive belt coupled between that capstan and the other capstan. Means (which may comprise the same belt that intercouples the motor with the capstans) is provided for coupling the hub extension with the motor so that the hub extension and the hub itself is driven to accelerate the tape pack each time the capstans begin to displace the tape through the system.

In accordance with another aspect of the invention, tension means is provided adjacent the output capstan to secure the tape against the output capstan at this point, and a random loop is provided in the tape between the output capstan and the point at which the tape is returned to the outermost turn of the tape pack.

THE DRAWINGS

The features of the present invention which are believed to be novel are set forth with a particularity in the appended claims. The organization and manner of operation of the invention may best be understood by reference to the following description taken in connection with the accompanying drawings, in the several figures of which like reference numerals identify like elements, and in which:

DESCRIPTION OF THE INVENTION

Figure 1:
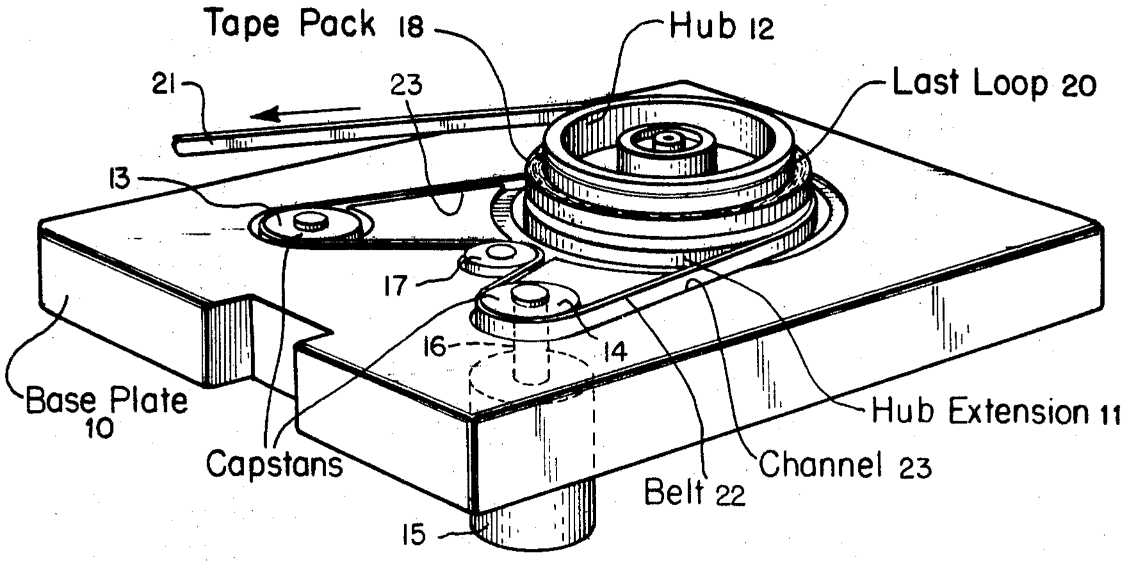
FIG. 1 is a perspective illustration depicting a portion of the inventive structure.

In FIG. 1 a base plate 10 is shown with an apertured portion in which a hub extension 11 is journalled for rotation, and a hub 12 is connected to the hub extension so that the hub is rotated when the hub extension is angularly displaced. Instead of a physical connection hub 12 and hub extension 11 can of course be different portions of a continuous shaft or cylindrical member. Also journalled for rotation in suitable cut-out portions of the base plate are lower portions of first and second capstans 13 and 14, respectively, and a motor 15 disposed below the base plate is connected over a shaft 16 to capstan 14. An idler 17 is disposed for free rotation in an annular cut-out portion of the base plate. The tape pack 18 is wound around the lower portion of hub 12, and the last (innermost) loop 20 of the pack is indexed around the upper part of hub 12. Reference numeral 21 designates the path of the tape as it is pulled from last loop 20 toward the haul-off capstan, which is not illustrated in this simplified view.

Figure 2:
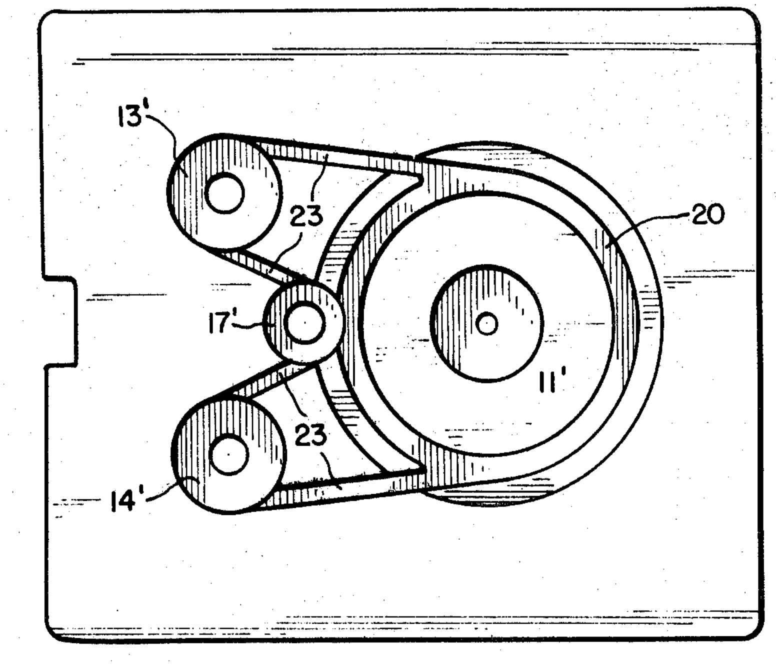
FIG. 2 is a top view of one portion of a tape recorder constructed in accordance with the inventive teaching.

In accordance with the present invention a belt 22 is provided and positioned to travel within a channel 23 formed in the base plate. The channel or passage 23 is of irregular configuration and, as better shown in FIG. 2, extends from the bore 14' for second capstan 14 to bore 11' in which hub extension 11 is received, thence to bore 13' for first capstan 13, from the other side of this bore to bore 17' for the idler wheel, and back to bore 14'. Belt 22 positively engages hub extension 11 and the lower portions of both capstans, and also engages idler wheel 17. It is this arrangement which provides positive acceleration of the tape pack and associated mechanism each time the motor 15 is energized to effect the displacement of belt 22 and thus drive the magnetic tape through the system.

Figure 3:
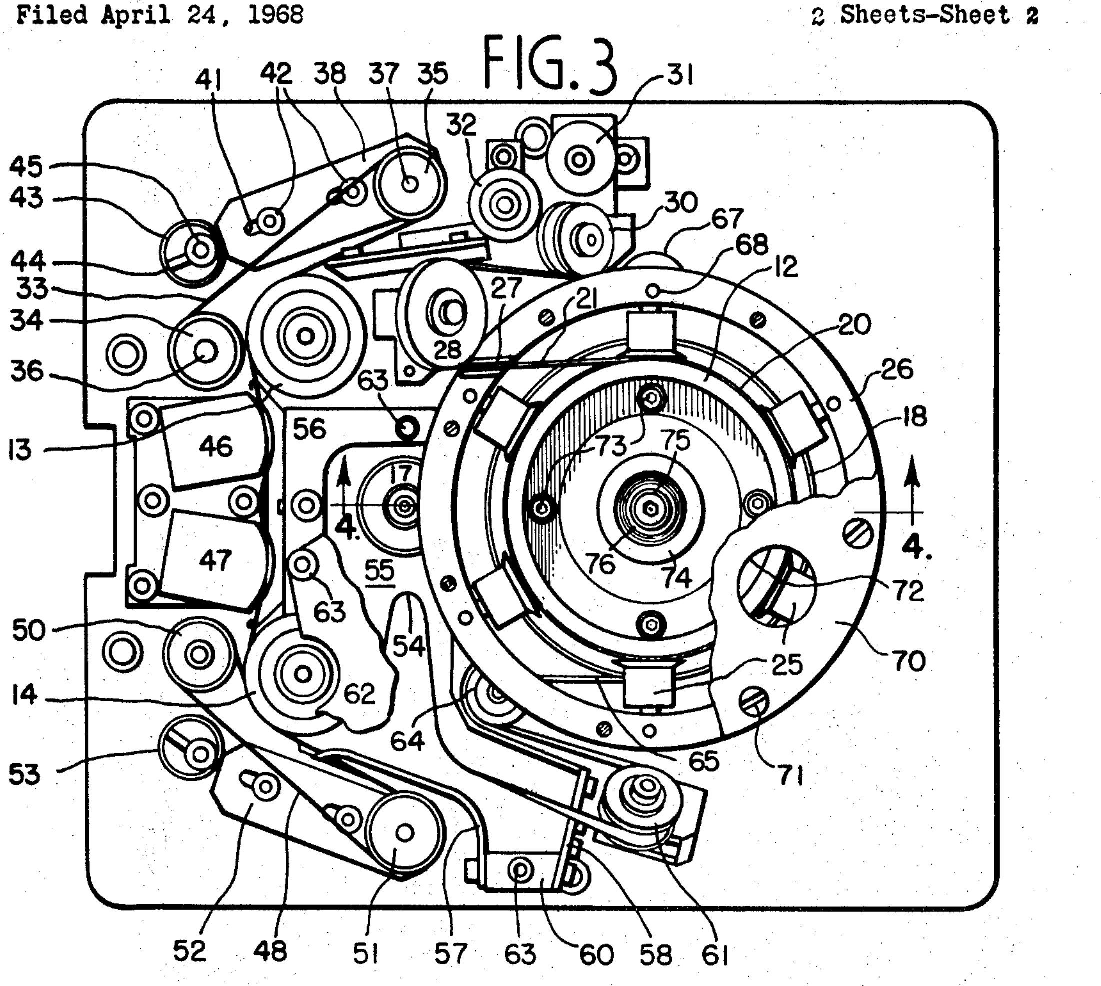
FIG. 3 is a top view of a tape recorder constructed in accordance with the inventive teaching.

FIG. 3 shows the travel of the magnetic tape from the tape pack past the heads and back to the exterior of the pack. The tape pack 18 is supported around hub 12 but only the innermost turn 20 engages the hub. The tape pack is maintained in an appropriate horizontal plane by a plurality of spider rollers 25 supported from a circular support ring 26. A passage 27 is provided in ring 26 to afford egress of tape from the pack, whence the tape passes around a first idler 28 to reverse the tape direction, a second canted idler 30, and around additional idlers 31 and 32 to the input or haul-off capstan 13. Those skilled in the art will appreciate that because the capstans 13 and 14 are disposed at a level below that at which the magnetic tape strand 21 is pulled through channel 27 from the pack, the canted idler rollers 28 and 30 are journalled along axes appropriate to return the tape to the lower level at which the tape driving, recording and reproducing takes place. As the tape passes from idler 32 to pass around input capstan 13, the tape is held against this haul-off capstan by a tension belt 33 journalled around a pair of rollers 34 and 35. A fastening screw 36 secures roller 34 to the base plate 10 so that the location of roller 34 relative to the base plate and to input capstan 13 is fixed. However the other roller 35 is secured by a fastening screw 37 to an end portion of a support plate 38, which includes a pair of elongated apertures 41 through which fastening screws 42 pass to retain plate 38 and roller 35 in a desired position. Abutting an end of plate 38 is an eccentric 43 which includes a lateral channel 44 through which another fastening screw 45 extends to secure the eccentric in a desired location. When the equipment is initially adjusted for operation, fastening screws 42 are loosened slightly as is screw 45, and eccentric 43 is positioned to displace plate 38 and roller 35 by the appropriate extent to produce the requisite tension level in the belt 33. In one embodiment this level was in the range of 2.5 to 4 inch-ounces. When the appropriate tension level is attained fastening screws 45 and 42 are tighened down to secure the tension-maintaining assembly in place.

The tape passes around haul-off capstan 13 and past the tape heads 46, 47 to the output or take-up capstan 14. The tape is secured against output capstan 14 by another tension belt 48, which is indexed around a fixed roller 50 and another roller 51 secured on the end of support plate 52 against an abutting eccentric 53. The positions of plate 52 and eccentric 53 are initially adjusted as just explained in connection with corresponding plate 38 and eccentric 43 to produce the appropriate tension level in belt 48. As described previously in connection with FIG. 1, output capstant 14 is driven directly from a motor 15 and a belt 22 imparts angular displacement to hub extension 11 and to the input capstan 13. Those skilled in the art will appreciate that the lower portion of capstan 13 can be made with a slightly larger diameter than the corresponding portion of output capstan 14 so that for a given linear displacement of the drive belt the angular velocity of the output capstan is greater and this capstan attempts to drive the ape slighly faster than the rate at which the tape is pulled from he pack and driven by the haul-off capstan 13. This arrangement, generally termed a differential capstan drive, provides the requisite tension across the recording and reproducing heads 46 and 47 to insure the accurate recording and reproducing of the signals between the heads and the magnetic tape. Moreover the angular velocity of the tape pack 18 is lower, relative to the velocity of input capstan 13, to maintain the proper tension between the tape at the point where it passes around the input capstan and the point at which the tape exits from the tape pack.

In accordance with another feature of this invention, after passing between output capstan 14 and the tension belt 48, the tape enters a slack or random loop portion 54 within an enclosure 55 generally termed a "random bin." The bin is defined by base plate 10, a right-angle wall member 56 extending from support ring 26 to a location adjacent output capstan 14, another wall member 57, an end wall 58, and a short support member 60. The wall portion 58 is slotted to provide a channel through which the tape emerges for passage around a canted guide roller 61. Only a portion of the top closure member 62 is depicted in FIG. 3 the better to illustrate the various mechanical aspects of the guidance arrangement. The top member 62 is affixed in place over the random loop by a plurality of fastening screws 63 when the equipment is readied for operation. The random loop 54 is important and significant because it allows free movement of the strand of tape onto the outer periphery of the tape pack without compacting the tape and placing undue stresses on the pack during any portion of the system operation. Because tension belt 48 engages and maintains the tape against the output capstan 14 there is no slack in the portion of the tape path adjacent the heads 46, 47 by reason of inclusion of the random bin.

After passing around canted guide roller 61 the tape partially encircles another idler 64 whence it returns, as indicated by the reference numeral 65, to the outermost portion of the tape pack for retention therein by the spider rollers 25. The tape is normally of the graphite-lubricated type to facilitate slippage of each turn with respect to the adjacent turns and thus accommodate the differences in angular velocity in different portions of the tape pack. If desired a resilient roller 67 can be provided just beneath the support ring 26 and affixed in place by a fastening screw 68, so that the roller 67 engages the outermost portion of the tape pack lightly and maintains the pack in the appropriate configuration. In a preferred embodiment the resilient roller has been omitted because it has been found that this roller is not necessary to afford proper movement and alignment of the tape within the pack and easy feeding into and out of the tape pack.

A portion of the top cover 70 is shown and a plurality of closure screws such as that referenced by numeral 71 are provided to affix the top cover 70 in place when the equipment is operated. The cover 70 defines a plurality of circular apertures 72 (only one of which is visible) positioned to observe the passage of the main tape pack 18 under the spider rollers 25 and the passage of the last loop 20 inside the spider rollers and around the upper portion of hub 12 before being drawn from the pack to pass around idler 28. Cover 70 has been broken away to show that hub extension 11 is affixed to hub 12 by a plurality of fastening screws 73, and hub extension 11 extends around a bearing 74 and a center post 75. These details are more clearly visible in FIG. 4, which is depicted on a scale twice that of FIG. 3.

Figure 4:
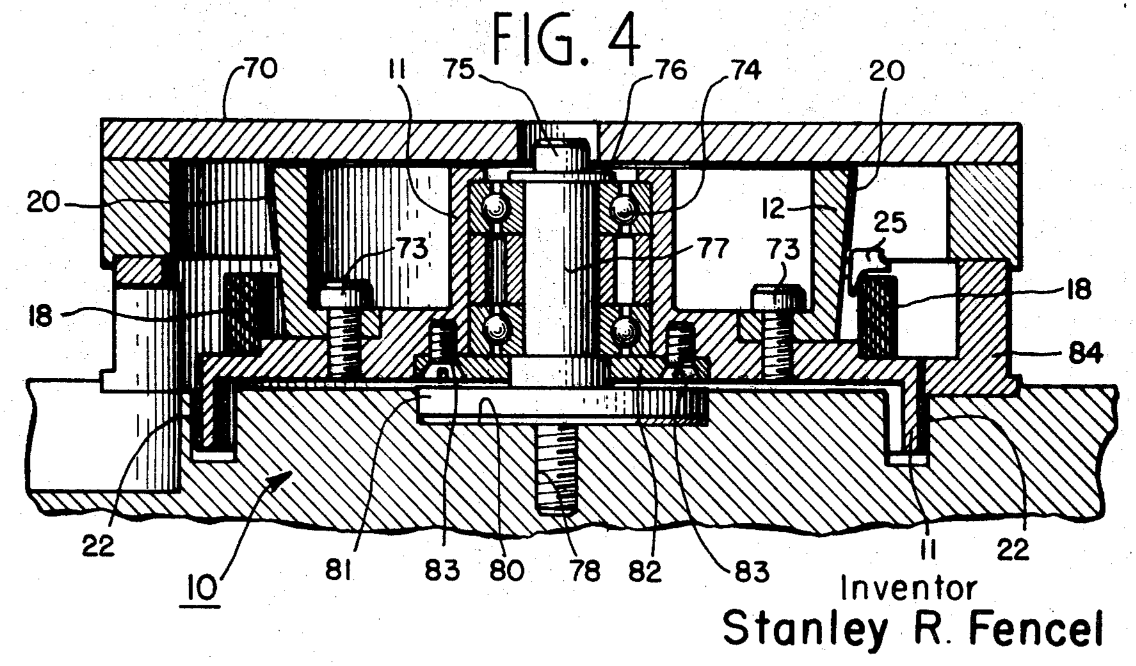
FIG. 4 is a sectional view, taken along the line 4—4 of FIG. 3 and on a scale enlarged with respect to that of FIG. 3, to better illustrate certain details of the novel and unobvious construction.

In FIG. 4 it is evident that the fastening post 75 has a head portion which secures a washer 76 over a central support shaft 77, around which bearing 74 is indexed. The lower portion of fastener 75 is threaded and received in a suitably tapped bore 78 in the base plate 10.

Above bore 78 is a circular bore 80 on which a bottom plate 81 rests. The interior of the bottom plate 81 supports the base of center shaft 77 and an annular spacer 82 has a central aperture which closely fits the base of center post 77. The outer portions of spacer 82 are apertured and disposed adjacent threaded bores in the upper portion of hub extension 11 such that fastening screws 83 secure the spacer 82 to the lower central portion of hub extension 11. The outer part of the hub extension includes a step portion into which the base of hub 12 is fitted and secured by the fastening screws 73. The extremity of hub extension 11 provides the driving surface which is engaged by drive belt 22 during operation of the recorder. A support wall is formed by member 84, secured in the base plate by welding or other suitable means. Tape pack 18 has its lower portion supported on a horizontal ledge of hub extension 11, and the inner portion of this ledge terminates at a shoulder or raised portion for indexing the tape pack (except for the last loop 20). The lower lips of spider rollers 25 effect a corresponding indexing and support of the tape pack, in vertical alignment with the shoulder of extension 11. A portion of one spider roller 25 is shown in FIG. 4 to better illustrate the invention even though inspection of FIG. 3 shows that this spider roller is not actually positioned along the section line of FIG. 4. The pack is contained in this configuration by the spider rollers and other portions of the restraining mechanism so that only the last or innermost loop 20 rides up on the interior of hub 12 before being pulled from the tape pack.

It is thus evident that the invention produces a substantial advance in the art by providing a mechanism which accelerates the hub, the tape strand as it leaves the tape pack, the last loop and the tape pack itself, as the capstans are energized to drive tape past the heads. This avoids scalping or undue wear on the tape without the necessity of felt pads or other static brake means which have been employed in the past. Another advantage realized by the invention is the prevention of any undue compressive forces on the outer loop of the tape as it is returned to the pack by the provision of a random bin which always maintains a slight amount of tape at the precise point where the tape returns to the pack.

While only a particular embodiment of the invention has been shown and described, it will be apparent to those skilled in the art that various changes and modifications may be made therein without departing from the invention in its broader aspects. Therefore the aim in the appended claims is to cover all such changes and modifications as may fall within the true spirit and scope of the invention.

What is claimed is:

1. An endless loop tape recorder having an annular hub for receiving and indexing the tape pack, including a hub extension mechanically coupled to said hub, and having a portion which supports the tape pack such that the tape pack is accelerated as the hub extension is accelerated, at least one head, a capstan arranged to draw the tape from the tape pack and drive the tape past the head, a motor connected to drive said capstan, and means for coupling said hub extension to said motor, to displace said hub extension and drive the hub to accelerate the tape pack each time the capstan begins to displace the tape through the system.

2. An endless loop tape recorder as claimed in claim 1 and further comprising a second capstan positioned to draw the tape from the first capstan past the head, and in which said means for coupling the hub extension to the motor includes a drive belt intercoupling said capstans to effect angular displacement of both capstans when said motor is energized to drive one of said capstans.

3. An endless loop recorder as claimed in claim 2 and in which means is provided to maintain the tape in contact with the one of said capstans nearer the point at which the tape is returned to the outside of the tape pack, and means defining a random bin in which a portion of the tape is contained after leaving said one capstan and before being wound on the outer turn of the tape pack, to avoid compressing the tape pack.

4. An endless loop tape recorder having an annular hub for receiving and indexing the tape pack, including a hub extension mechanically coupled to said hub, and having a portion which supports the tape pack such that the tape pack is accelerated as the hub extension is accelerated, at least one tape head, a first capstan positioned between the head and the point at which the tape is drawn from the interior of the tape pack, arranged to draw the tape out from the center of the tape pack and pass the tape toward the head, a second capstan positioned between the tape head and the point at which the tape is returned to the outermost turn of the tape pack, arranged to rotate at an angular velocity such that the tape is maintained taut as it passes the tape head, a motor and a drive belt connected to drive said first and second capstans, and means including said drive belt for coupling said hub extension to said motor, to displace said hub extension and drive the hub to accelerate the tape pack each time the capstans being to displace the tape through the system.

5. An endless loop recorder as claimed in claim 4 and in which a tension belt is provided to maintain the tape in contact with the one of said capstans nearer the point at which the tape is returned to the outside of the tape pack, and means is provided to define a random bin in which a portion of the tape is contained after leaving said one capstan and before being wound on the outer turn of the tape pack, to avoid compressing the tape pack.

References Cited

UNITED STATES PATENTS

| | | | |
|---|---|---|---|
| 2,426,838 | 9/1947 | Miller | 242—55.19X |
| 3,149,207 | 9/1964 | Maxey | 179—100.2Z |
| 3,155,335 | 11/1964 | Maeder | 242—55.19A |
| 3,235,195 | 2/1966 | Hebb et al. | 242—55.19A |
| 3,311,315 | 3/1967 | Stark | 242—55.19 |
| 3,489,362 | 1/1970 | Linning | 242—55.19A |

FOREIGN PATENTS

| | | | |
|---|---|---|---|
| 1,260,812 | 2/1968 | Germany | 242—55.19A |
| 1,087,368 | 10/1967 | Great Britain | 242—55.19 |

STANLEY N. GILREATH, Primary Examiner